United States Patent
Bühlmaier et al.

(10) Patent No.: US 7,367,437 B2
(45) Date of Patent: May 6, 2008

(54) SHIFTING DEVICE

(75) Inventors: Fritz Bühlmaier, Lorch (DE); Martin Schetter, Besigheim (DE)

(73) Assignee: DaimlerChrysler AG, Stuttgart (DE)

( * ) Notice: Subject to any disclaimer, the term of this patent is extended or adjusted under 35 U.S.C. 154(b) by 268 days.

(21) Appl. No.: 11/249,057

(22) Filed: Oct. 12, 2005

(65) Prior Publication Data

US 2006/0037829 A1 Feb. 23, 2006

Related U.S. Application Data

(63) Continuation-in-part of application No. PCT/EP2004/003568, filed on Apr. 3, 2004.

(30) Foreign Application Priority Data

Apr. 12, 2003 (DE) ................... 103 16 947

(51) Int. Cl.
*F16D 23/06* (2006.01)
(52) U.S. Cl. .................. 192/53.32; 192/53.34; 192/109 R
(58) Field of Classification Search ............. 192/53.32, 192/53.34, 53.341
See application file for complete search history.

(56) References Cited

U.S. PATENT DOCUMENTS

| | | | | |
|---|---|---|---|---|
| 3,612,235 A | * | 10/1971 | Ashauer et al. | 192/53.34 |
| 5,538,119 A | * | 7/1996 | Johnson, Jr. | 192/53.34 |
| 5,657,844 A | * | 8/1997 | Wagner | 192/53.32 |
| 5,887,688 A | * | 3/1999 | Ploetz et al. | 192/53.341 |

FOREIGN PATENT DOCUMENTS

DE 10316947 B3 * 8/2004

* cited by examiner

*Primary Examiner*—Richard M Lorence
(74) *Attorney, Agent, or Firm*—Klaus J. Bach

(57) ABSTRACT

In a shifting device, for a power transmission having a sliding sleeve which is arranged on a transmission shaft and which can be brought into operative engagement with at least one corresponding clutch member and which is limited in its sliding movement by at least one stop structure, the stop structure is formed by a component, in relation to which the sliding sleeve, in its striking position, has some freedom of movement to avoid contact between the sleeve and the stop structure.

9 Claims, 2 Drawing Sheets

SHIFTING DEVICE

This is a Continuation-In-Part Application of International Application PCT/EP2004/003568 filed Apr. 3, 2004 and claiming the priority of German application 103 16 947.4 filed Apr. 12, 2003.

BACKGROUND OF THE INVENTION

The invention relates to a shifting device for a motor vehicle transmission having a sliding sleeve which can be operatively engaged with a clutch member.

DE 38 03 845 A1 discloses such a shifting device for a motor vehicle transmission. The shifting device comprises a sliding sleeve which is arranged on a shaft and which can be brought into operative connection with corresponding clutch members. The clutch members have clutch teeth with stops for limiting the axial sliding movement of the sliding sleeve.

It is the object of the present invention to provide a shifting device with relatively little overall space requirements.

SUMMARY OF THE INVENTION

In a shifting device for a power transmission having a sliding sleeve which is arranged on a transmission shaft and which can be brought into operative engagement with at least one corresponding clutch member and which is limited in its sliding movement by at least one stop, the stop is formed by a component, in relation to which the sliding sleeve, in its end position adjacent a stop formed by a transmission component, has some freedom of movement to avoid contact between the sleeve and the component.

The design freedom can be increased as there is no need for additional components to form a stop, thereby providing for overall space savings both in a radial and in an axial direction. There is no need for recesses and/or raised elevations on the sliding sleeve and/or on a synchromesh member so that the production costs are reduced and the operational reliability of the components is increased.

The stop may be formed by various components considered to be suitable by a person skilled in the art, such as a housing part, for example, or advantageously by a component coupled to a second shaft, such as, in particular, a gear opposite a gear to be shifted. This means that the solution according to the invention can be used in numerous conventional transmissions, and particularly advantageously if a shifting device where a gearwheel to be shifted by means of a sliding sleeve has a smaller diameter than the sliding sleeve of the shifting device.

If the component forming the stop has a separately formed stop face it is possible, to essentially prevent wobbling movements in the striking position and to reduce the wear.

A stop face formed by a formed-on raised structure can be provided inexpensively and without requiring extensive finishing work.

In a further development a stop face of the sliding sleeve is arranged in some area other than the tips of a sliding sleeve toothing. This avoids wear of the tips due to the movement of the sliding sleeve in relation to the component forming the stop. In this case the stop face is advantageously arranged in the radially outer area of the tips, proceeding from the component forming the stop towards the sliding sleeve in front of the tips.

The shifting device further comprises a return unit, which in operation moves the sliding sleeve from its striking position to an end position at a distance from the stop structure. In the end position the return unit therefore there is no friction between the sliding sleeve and the component forming the stop and there is no noise and no transmission of vibrations which such friction could cause.

The return unit can be made particularly cost-effective and compact if the return unit has a chamfer generating a return force in a return sequence. This saves the need for additional components, assembly work and costs, especially if the chamfer is formed onto the sliding sleeve, for example preferably in the form of an end chamber of a back taper of the sliding sleeve. In principle, however, the return unit could also be formed by other mechanisms based on spring, centrifugal and/or magnetic forces that appear suitable to a person skilled in the art.

An advantageous return force can be obtained if the chamfer has an angle of less than, or equal to, 15° and it is moreover possible, to prevent unwanted forces of a synchronization ring acting on the sliding sleeve at least to a large extent, together with undesirable vibrations.

The invention and its advantages will become more readily apparent from the following description of an exemplary embodiment thereof on the basis of the accompanying drawings.

DESCRIPTION OF A PREFERRED EMBODIMENT

Figure 1:
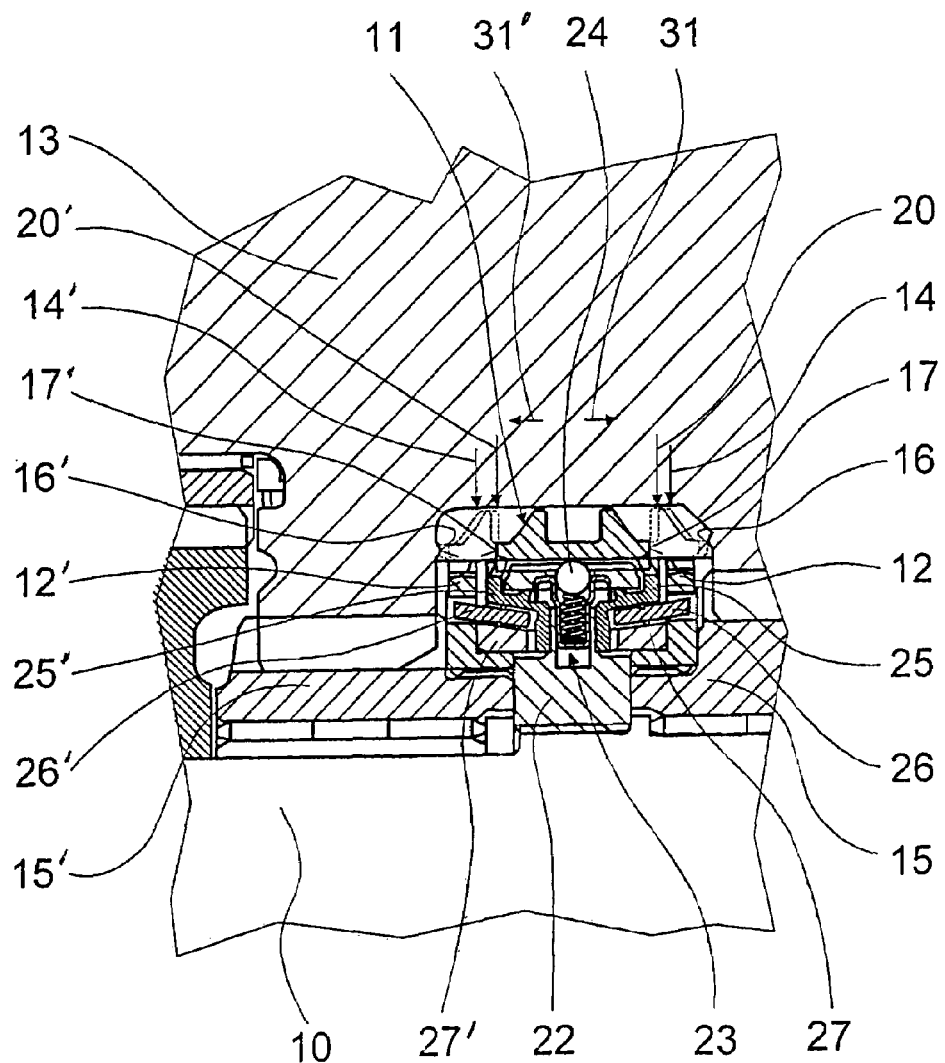
FIG. 1 shows in detail a shifting device according to the invention in a longitudinal sectional view.

FIG. 1 shows a detail of a shifting device according to the invention for a motor vehicle transmission having a sliding sleeve 11, which is displaceably arranged on a secondary transmission shaft 10 and which can be brought into operative connection with two corresponding clutch members 12, 12'.

The sliding sleeve 11 is rotationally locked to a synchromesh member 22 by way of a formed-on internal toothing and an external toothing of a synchromesh member 22, which is in turn rotationally locked to the secondary transmission shaft 10 by way of a formed-on external toothing and by way of an external toothing of the transmission shaft 10. In the synchromesh member 22, pressure pieces 23 with retaining balls 24 are distributed over the circumference. Axially adjoining the synchromesh member 22 are synchromesh rings 25, 25', each having a friction cone and each being capable of being brought into operative connection via a friction ring 26, 26' with a corresponding counter-taper of a cone ring 27, 27', rotationally locked to the clutch members 12, 12'.

The clutch member 12 is rotationally locked to a rotatable gear 15 and the clutch member 12' is rotationally locked to a rotatable gear 15', the gear 15 meshing with a first mating gear structure integrally formed onto a component 13 and the gear 15' meshing with a second mating gear structure integrally formed onto the component 13. The component 13 forms a part of a main transmission shaft arranged parallel to the secondary shaft 10.

When the rotatable gear 15 is to be engaged, the sliding sleeve 11 is displaced towards the rotatable gear 15. When the rotatable gear 15' is to be engaged, the sliding sleeve 11 is displaced towards the rotatable gear 15'. In so doing the sliding movement of the sliding sleeve 11 is in each case limited by a stop. According to the invention the stops are formed by the component 13, in relation to which the sliding sleeve 11, in its striking position 14, 14', has some relative freedom of movement.

The component 13 and the mating gears integrally formed onto the component 13 each have stop faces 16, 16', which are separately formed in an axial direction to the sliding sleeve 11 and are formed by bead-shaped annularly arranged axial projections.

Figure 2:
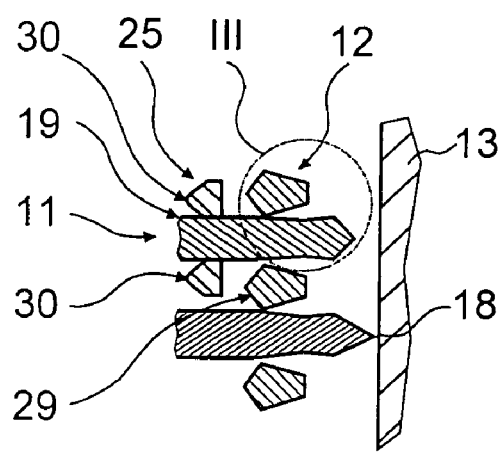
FIG. 2 shows part of a development of a synchronizing and shift engagement with a sliding sleeve in a striking position.
Figure 3:
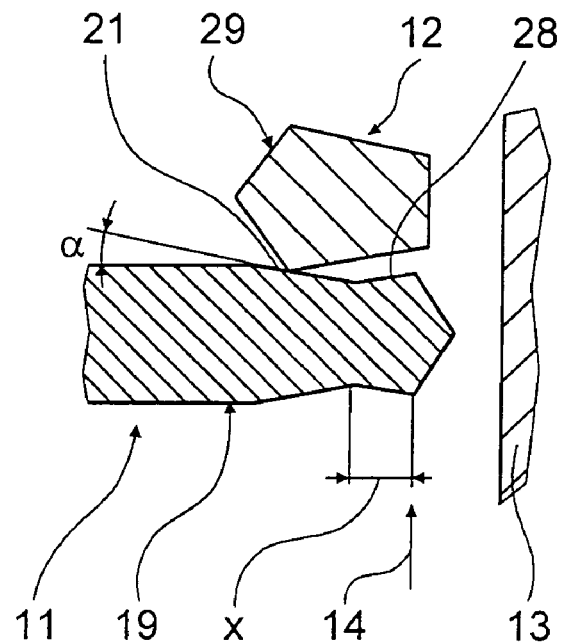
FIG. 3 shows an enlarged detail III of FIG. 2.
Figure 4:
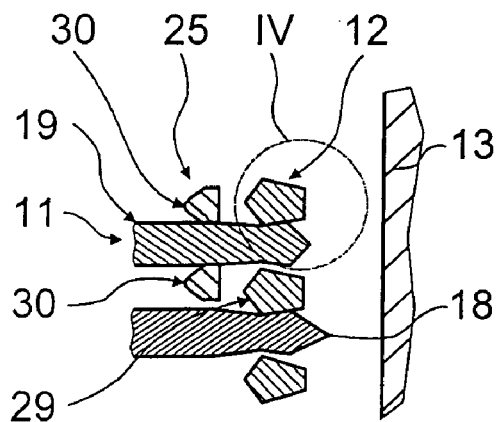
FIG. 4 shows a detail corresponding to the detail in FIG. 2 with a sliding sleeve in an end position.

At its axial end faces the sliding sleeve 11 has stop surfaces 17, 17' which correspond to the stop faces 16, 16' and which are arranged radially outside the tips 18 of a sliding sleeve toothing 19 (FIGS. 1 and 2).

Before the sliding sleeve 11 is coupled to the clutch member 12 or 12', the sliding sleeve 11 and the corresponding clutch member 12 or 12' are synchronized to the same speed in a known manner by way of the synchromesh ring 25 or 25'. In principle, other mechanisms that appear suitable to the person skilled in the art, such as claws etc., are also feasible instead of a synchromesh device with synchromesh rings.

FIG. 2 shows a detail of a development of the sliding sleeve toothing 19 of the sliding sleeve 11 of a synchromesh ring toothing 30 of the synchromesh ring 25 and a clutch toothing 29 of the clutch member 12 on completion of a synchronizing and shift engagement sequence: The sliding sleeve 11 is in an end position 14 in which the rotatable gear 15 is engaged and abuts with its stop face 17 the stop face 16 of the first mating gear structure of the first counter gear structure 13. The stop face 17 is disposed in front of the sliding sleeve 11 ahead of the tips 18 of meshing teeth of the sliding sleeve toothing 19 and bears against the stop face 16 of the first mating gear structure. Any direct contact between the tips 18 of the sliding sleeve toothing 19 and the first mating gear structure is avoided by virtue of the abutment of the corresponding stop faces 16, 17.

A return unit of the shifting device serves to bring the sliding sleeve 11 from its striking position 14 into an end position 20 at a distance from the stop (FIGS. 2 and 3, 4 and 5). In a return sequence the return unit has a chamfer 21 generating a return force, the chamfer 21 being formed by an end bevel of a back taper 28 formed onto the sliding sleeve 11 or onto the sliding sleeve toothing 19, and the chamfer having an angle $\alpha$ of approximately 5.5° to an actuating device 31 of the sliding sleeve 11. The chamfer 21 is formed both onto the meshing teeth and onto locking teeth of the sliding sleeve toothing 19. The teeth of the sliding sleeve 11 furthermore have back tapers 28 and chamfers 21 both in a first and in a second peripheral direction.

The back taper 28, which is formed by a chamfer enclosing an angle of approximately 4° to the actuating device 31 and in combination with a chamfer of the clutch toothing 29 serves to produce an undercut in the limit position 20 and thereby serves for maintaining the gear, is foreshortened by approximately 20% to 40% and has a length X of approximately 5 mm, compared to a standard toothing, which in a current design would have a length of approximately 7 mm.

Figure 5:
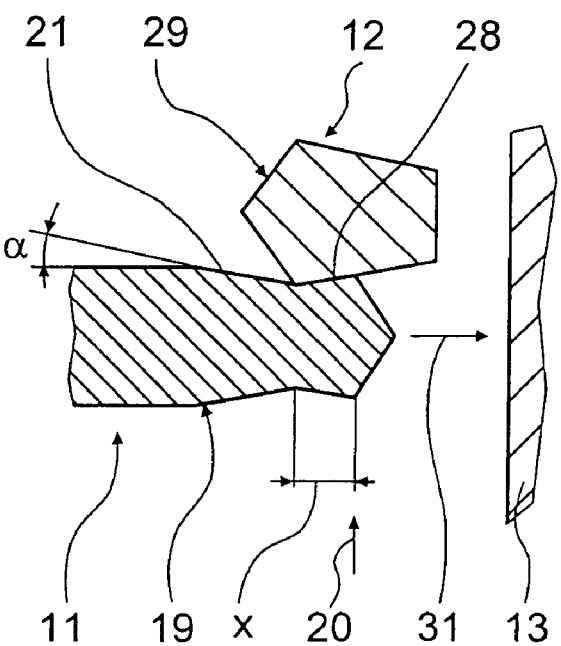
FIG. 5 shows an enlarged detail V of FIG. 4.

The teeth, that is to say both the meshing teeth and the locking teeth of the sliding sleeve toothing 19, are v-shaped, being formed by the back taper 28 and the chamfer 21 directly adjoining the back taper 28 in an axial direction. In the limit position 20 the sliding sleeve 11 bears with its back taper 28 on the clutch member 12 and with its depression arranged between the chamfer 21 and the back taper 28 comes to lie in the area of an edge, pointing in a circumferential direction and formed onto the clutch toothing 29, so that an equilibrium of forces is established in an axial direction (FIG. 5).

A shifting sequence for shifting the rotatable gear 15' corresponds to the shifting sequence for the shifting of the rotatable gear 15 and for this reason will not be described in detail again.

What is claimed is:

1. A shifting device, for a power transmission, comprising a transmission shaft (10), clutch members (12) which are disposed on the transmission shaft (10) and a sliding sleeve (11) which is slidably supported on the transmission shaft (10) and has a sleeve toothing (19) for operative connection with at least one corresponding clutch member (12) and which is limited in its sliding movement by at least one stop structure (16), said stop structure (16) being formed by a transmission component (13), in relation to which the sliding sleeve (11), in a striking position (14) thereof, has some freedom of operating movement providing for a clearance during operation of the transmission between the stop structure and the sliding sleeve (11) and a return structure formed on the sleeve toothings and the clutch member (12), which in operation moves the sliding sleeve (11) from its striking position (14) into an end position (20) at a distance from the striking position (14).

2. The shifting device as claimed in claim 1, wherein the component (13) forming the stop is coupled to another shaft of the transmission.

3. The shifting device as claimed in claim 2, wherein the component (13) forming the stop structure (16) is integrally formed with a mating gear.

4. The shifting device as claimed in claim 3, wherein the component (13) forming the stop structure (16) has at least one separately formed stop face (16).

5. The shifting device as claimed in claim 4, wherein the stop face (16) is formed by a formed-on raised structure.

6. The shifting device as claimed in claim 1, wherein at least one stop face (17) of the sliding sleeve (11) is arranged in an area other than the tips (18) of a sliding sleeve toothing (19).

7. The shifting device as claimed in claim 1, wherein the return structure has a chamfer (21) generating a return force returning said sleeve (11) to said end position.

8. The shifting device as claimed in claim 7, wherein the chamfer (21) is formed onto the sliding sleeve (11).

9. The shifting device as claimed in claim 8, wherein the chamfer (21) has an angle ($\alpha$) of not more than 15°.

* * * * *